United States Patent [19]
Beltzer

[11] 3,880,722
[45] Apr. 29, 1975

[54] POTENTIOMETRIC CO DETECTOR

[75] Inventor: Morton Beltzer, Westfield, N.J.

[73] Assignee: Exxon Research and Engineering Company, Linden, N.J.

[22] Filed: Jan. 2, 1973

[21] Appl. No.: 320,317

[52] U.S. Cl............ 204/1 T; 23/232 E; 23/254 E; 324/71 R
[51] Int. Cl. .......................................... G01n 27/46
[58] Field of Search........ 23/232 E, 254 E; 204/1 T, 204/195 R; 324/30 B, 71 R

[56] References Cited
UNITED STATES PATENTS
| | | | |
|---|---|---|---|
| 751,897 | 12/1904 | Bodlander | 23/232 E |
| 1,891,429 | 12/1932 | Ljunggren | 23/232 R |
| 2,517,382 | 8/1950 | Brinker et al. | 204/195 R |

OTHER PUBLICATIONS
Chem. Abstr., Vol. 76, No. 35597W (1972).

*Primary Examiner*—Morris O. Wolk
*Assistant Examiner*—Timothy W. Hagan
*Attorney, Agent, or Firm*—H. N. Wells

[57] ABSTRACT

An instrument for the detection and measurement of the carbon monoxide content of gases, particularly in automobile exhaust, wherein CO is reacted with water to form $CO_2$ and hydrogen ions and producing a voltage change which is proportional to the CO content of the gas under suitable conditions. The reaction takes place in an aqueous solution and employs suitable oxidizing agents amd a palladium salt catalyst.

6 Claims, 2 Drawing Figures

POTENTIOMETRIC CO DETECTOR

BACKGROUND OF THE INVENTION

This invention relates to a method and apparatus for the measurement of relatively small quantities of carbon monoxide present in gaseous form. In particular, it relates to a method for measuring carbon monoxide contained in automobile exhaust gases.

It is well known that carbon monoxide presents a significant health hazard, particularly in confined spaces where even quite small quantities may have serious, if not fatal, effects. As related to automobile exhaust, the quantity of CO contained therein, in addition to any detrimental effects on public health, is also an indicator of the efficiency of combustion. For both of these reasons, carbon monoxide has been specified as a pollutant in automobile exhaust which is to be controlled according to U.S. Governmental specifications. In order to determine whether a particular vehicle is producing an acceptable level of CO, it is important to have a convenient, relatively low cost, but accurate method of determining the amount of CO present in the automobile exhaust. Typically, the CO limit has been specified to be 1.5 percent for new cars produced during the year 1973. For other cars produced earlier and cars in poor condition, CO content may considerably exceed the new car specification up to approximately 4.5 percent.

In the prior art, a number of methods of determining CO content will be found. Principally, they are directed to measurement of carbon monoxide in confined spaces where small amounts of CO may be injurious to health. Such instruments operate within the range of 0.01 to 0.1 percent CO. The traditional method for making such determinations relies on reducing palladium chloride ($PdCl_2$) by carbon monoxide, thus precipitating metallic palladium and indicating by the depth of the color the percentage of CO present. For an example of this method, see U.S. Pat. No. 1,891,429.

Other prior art methods include the selective combustion of CO with detection of the heat effect produced thereby (see U.S. Pat. No. 2,531,592), measurement by a ceramic electrolyte fuel cell and infrared spectroscopy.

None of the prior art methods, however, are fully satisfactory for the desired purpose of measuring CO content in automobile exhaust. A successful instrument for the measurement of CO content in automobile exhaust must be relatively inexpensive, rugged enough for field use, and reliable. A novel method and apparatus disclosed herein meets these requirements.

SUMMARY OF THE INVENTION

Carbon monoxide is detected and measured by the voltage change resulting from the oxidation of carbon monoxide by suitable oxidants to form carbon dioxide and hydrogen ions. The reaction is catalyzed by palladium salts which remain in solution and do not precipitate as in the prior art due to the presence of certain oxidizing agents. These oxidizing agents are disclosed hereinafter. According to a preferred embodiment ferric ions as contributed by a solution of iron salts is used. The reaction of carbon monoxide as it is bubbled into a solution of ferric salts and palladium salts produces a voltage (measured against an unreacted solution) which increases linearly with the time of exposure for short exposure times and small extents of reaction in terms of oxidant consumed. The voltage measured at any given time of exposure is related to the CO content, assuming other variables are constant. Thus, the CO content may be measured by bubbling a CO containing gas into a standard solution at a known rate and comparing the voltage measured with those determined from standard gases having known amounts of CO.

DESCRIPTION OF THE PREFERRED EMBODIMENT

Figure 1:
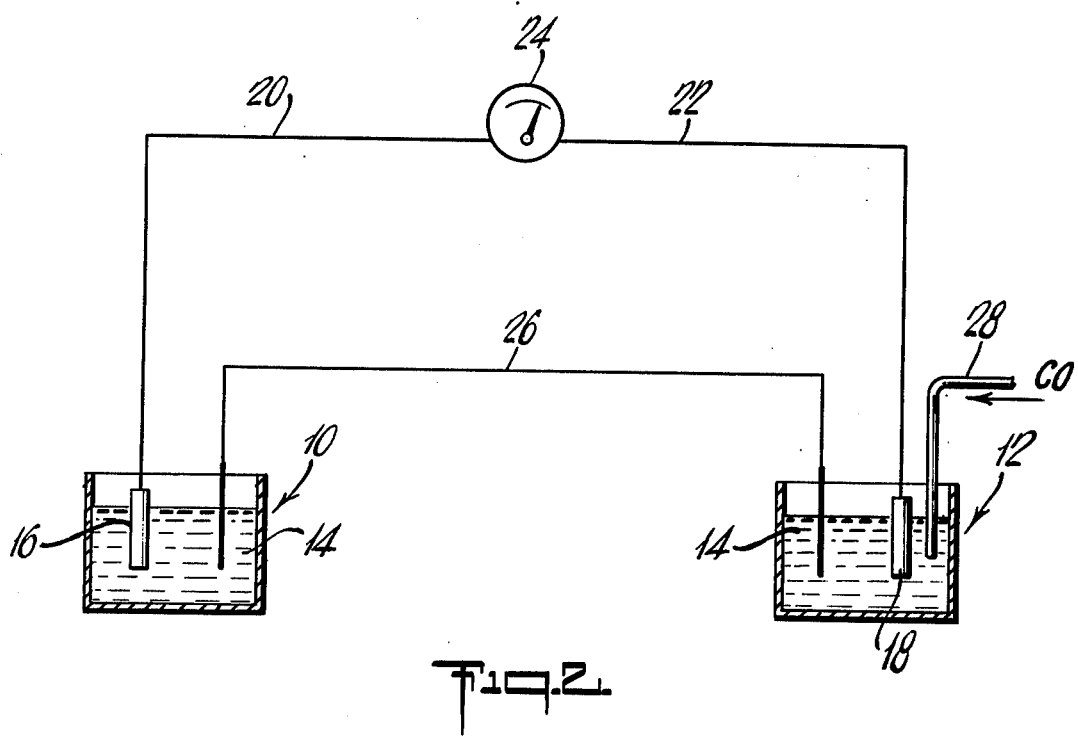
FIG. 1 illustrates a schematic view of a potentiometric CO detector according to the present invention.

Carbon monoxide according to the invention is detected by measuring the voltage generated by the reaction of carbon monoxide with an electrochemically active species. Typically, this will be a ferric ion contributed by iron salts in solution. Other oxidizing agents may be used, including a wide variety of quinones, and cupric ions. When cupric ion is the oxidant, the electrodes must be cupric ion indicating electrodes. Ferric salts or quinones require electrodes such as platinum or gold. The reaction proceeds according to the following equation:

1

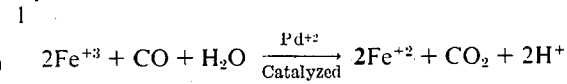

Contrary to the prior art, precipitation of metallic palladium does not occur in this reaction because the oxidation of palladium metal to the +2 form by $Fe^{+3}$ occurs more rapidly than reduction of palladium +2 to metallic palladium by CO. Thus, palladium acts primarily as a catalyst and does not contribute to the detection of carbon monoxide as in the prior art wherein palladium metal is precipitated. A theoretical basis for the operation of the detector is given below. The detector gives a voltage dependent upon the concentration of CO in the gas phase and the time of exposure. The rate equation for the change of ferric ion content is:

2

$$-d[Fe^{+3}]/dt = k_1 [P_{co}] [Pd^{+2}] [Fe^{+3}]^2$$

Where:

[$Fe^{+3}$] = concentration of ferric ions

[$P_{co}$] = partial pressure of carbon monoxide

[$Pd^{+2}$] = concentration of palladium ions $k_1$ = rate constant dependent on flow rate of the sample gas.

Since the concentration of carbon monoxide is constant in any given analysis, and since the amount of palladium present is constant, equation (2) can be stated as:

3

$$-d[Fe^{+3}]/dt = k_2 [P_{co}] [Fe^{+3}]^2$$

Where:

$$k_2 = k_1 [Pd^{+2}]$$

At time zero [$Fe^{+3}$] = $a$; [$Fe^{+2}$] = $b$; and $a >> b$. At time $t$, [$Fe^{+3}$] = $(a-x)$; [$Fe^{+2}$] = $(b+x)$; and $x$ = equivalents of ferric ions converted to ferrous ions, per unit volume. Thus at time $t$, equation (3) becomes:

$$-d(a-x)/dt = k_2[P_{co}](a-x)^2$$

integrating equation (4) gives equation (5):

$$x/a(a-x) = k_2[P_{co}]t$$

and where $x$ is much less than $a$, equation (5) can be written:

$$x = a^2 k_2 [P_{co}] t$$

At time zero, the equation for voltage of the ferric, ferrous system relative to some reference electrode is as follows:

$$E_{t=o} = E_1 = E° + RT/F \ln(a/b)$$

Where:
 $E_1$ = voltage at time zero
 $E°$ = standard voltage
 $R$ = universal gas constant
 $T$ = absolute temperature
 $F$ = Faraday's constant At time $t$, the corresponding equation is:

The voltage difference between an electrode immersed in a solution not exposed to CO, and an identical electrode immersed in an equivalent solution exposed to CO for a time $t$ can be calculated from equation (9), obtained by subtracting equation (8) from (7).

$$\Delta E = RT/F (\ln[1 - x/a] - \ln[1 + x/b])$$

Combining equation (6) with equation (9) and rearranging, recognizing that both $x/a$ and $x/b$ are less than 1, yields the following:

$$\Delta E = RT/F [(b+a)/ab] a^2 k_2 [P_{co}] t$$

Since for any given solution $a$ and $b$ are fixed, equation (10) can be written:

$$\Delta E = K[P_{co}]t$$

Where:

$$K = (b+a/b) ak_2$$

Figure 2:
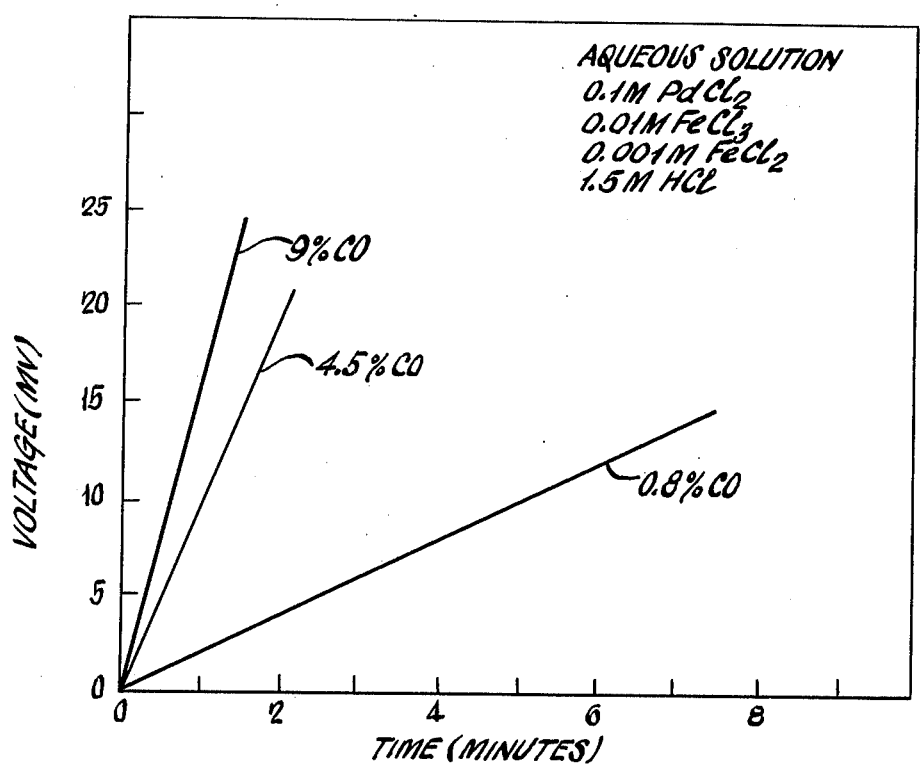
FIG. 2 illustrates the behavior of the instrument of FIG. 1 when exposed to varying amounts of CO.

If the initial ratio $[Fe^{+3}]/[Fe^{+2}]$ is a large value, that is $a \gg b$, then $K = a^2/b\, k_2$. Since the voltage sensitivity is also a function of the original ratio of $Fe^{+3}$ to $Fe^{+2}$, the ratio may be varied to adjust the system sensitivity so that the resulting voltage change can be accurately determined. By inspection it can be seen that the voltage generated by reaction of the iron system with carbon monoxide will be directly proportional to the partial pressure of CO at a constant time of exposure. Also, for a constant carbon monoxide content being measured, the generated voltage will be directly proportional to the time. This result is illustrated in the experimentally determined curves of FIG. 2.

In practice, for a known solution, a CO-containing gas may be introduced into the solution for a given period of time and the voltage measured and compared to the voltage obtained with standard gases containing known quantities of CO. As can be seen from the curves of FIG. 2, the detector generates significant voltages with concentrations of CO in the range which are normally encountered in automobile exhaust. Thus, a simple instrument is developed which will measure CO content and which also is insensitive to contaminants. Since the voltages measured are significantly large, relatively inexpensive, electrical measuring means such as potentiometers may be used.

A typical schematic illustration of an instrument capable of measuring CO content is illustrated in FIG. 1. Two containers are used, container 10 for standard solution and container 12 for the test solution of identical composition into which CO-containing gas is to be introduced. Electrodes 16 and 18 are immersed in these solutions. These electrodes may be platinum or gold or other materials such as titanium carbide, graphite, amalgams of platinum and gold and mercury. If a cupric-cuprous ion system is used, a cupric ion sensitive electrode is used, typically a solid state sulfide ionic conductive membrane type, which, since it senses cupric ion through both sulfide and silver is an electrode of the third kind. The connection between the electrodes 16 and 18 includes a standard volt meter 24 connected to the electrodes by electrically conductive connections 20 and 22. The electrical circuit is completed by means of salt bridge 26 interconnecting the two solutions. CO gas is introduced through sparger pipe 28 and continued for a known period of time for direct comparison against standard CO-containing gases, or, alternatively, voltage generated and measured by volt meter 24 may be recorded as the CO is bubbled into the iron-containing solution to obtain a straightline such as in FIG. 2. This line may be compared to other lines which have been obtained for known concentrations of CO and by interpolation the amount of CO in the gas being measured may be obtained.

Although the preferred embodiment is intended to measure concentration of CO, the detector may be used as an integrating device since the voltage difference will still increase, although becoming non-linear after a significant portion of the oxidizing agent has been reacted. Once the maximum voltage has been reached, a predetermined amount of CO will have been reacted and no further voltage change will occur.

The foregoing description of the preferred embodiment of the invention is for illustrative purposes only and not intended to limit the scope of the invention which is determined by the claims which follow.

What is claimed is:

1. A method of measuring the CO concentration of a gas comprising:
   a. admitting gas which may contain CO to a first aqueous solution containing hydrogen chloride and at least a single oxidizing agent selected from the group consisting of ferrous and ferric ions, quinones, and cupric ions and a palladium chloride catalyst in amounts sufficient for producing a voltage which increases linearly with time when CO reacts with said solution,
   b. measuring the voltage difference at a time, $t$, following reaction of CO with said solution between said first solution and a second aqueous solution comprising the same oxidizing agent as said first solution and not in contact with said CO-containing gas whereupon the measured voltage difference, $\Delta E$, is linearly dependent upon the concentration of CO in said gas and the time exposure of said gas to said first solution in accordance with the following equation:

$$\Delta E = K [P_{co}]t$$

Where: $K = a^2/b\ k_2$, and

Wherein:

[Pco] = the partial pressure of CO in said gas, $t$ = the time elapsed from zero reference at which the voltage measurement is made, $a = [Fe^{+3}]$ = the concentration of ferric ions in said first solution, $b = [Fe^{+2}]$ = the concentration of ferrous ions in said first solution, and $k_2 = k_1[Pd^{+2}]$ = the rate constant dependent on flow rate of said gas times the concentration of palladium ions in said first solution;

c. comparing said voltage difference of (b) with a reference correlation between known CO content of a gas and the voltage generated, thereby obtaining the CO concentration of said gas.

2. The method of claim 1 wherein said first and second solutions initially have the same composition.

3. The method of claim 1 wherein the voltage sensitivity is adjusted by varying the concentration ratio of said oxidizing agent in its oxidized to reduced form.

4. The method of claim 1 wherein CO-containing gas is admitted until a maximum voltage change has been achieved, thereby measuring the total CO content of the gas passed through the first solution.

5. A method for measuring the CO concentration of exhaust gas from an internal combustion engine comprising:

a. admitting said exhaust gas to a first aqueous solution containing about 1.5 M HCl, 0.01 M FeCl$_3$, 0.001 M FeCl$_2$ and about 0.1 M PdCl$_2$ catalyst;

b. measuring the voltage difference between said first aqueous solution exposed to said exhaust gas and a second aqueous solution of the same composition as said first solution, said second solution not being exposed to said CO-containing gas;

c. comparing said voltage difference of (b) with a reference correlation between known CO content of a gas and the voltage generated, thereby obtaining the CO concentration of said gas.

6. The method of claim 5 wherein the voltage sensitivity is adjusted by varying the concentration ratio of FeCl$_3$ to FeCl$_2$.

* * * * *